(No Model.)

2 Sheets—Sheet 1.

T. R. BOONE.

PUZZLE.

No. 268,991. Patented Dec. 12, 1882.

Attest.
Chas. L. Spencer
E. P. Follett

Inventor.
Thos. R. Boone,
per R. F. Osgood,
atty (No Model.) 2 Sheets—Sheet 2.

T. R. BOONE.
PUZZLE.

No. 268,991. Patented Dec. 12, 1882.

Attest.
Chas. F. Spencer
E. P. Follett

Inventor:
Thos. R. Boone,
W. R. F. Osgood,
Atty

UNITED STATES PATENT OFFICE.

THOMAS R. BOONE, OF ROCHESTER, NEW YORK.

PUZZLE.

SPECIFICATION forming part of Letters Patent No. 268,991, dated December 12, 1882.

Application filed September 4, 1882. (No model.)

*To all whom it may concern:*

Be it known that I, THOMAS R. BOONE, of Rochester, Monroe county, New York, have invented a certain new and useful Improvement in Puzzles; and I do hereby declare that the following is a full, clear, and exact description of the same, reference being had to the accompanying drawings, in which—

Figure 1:
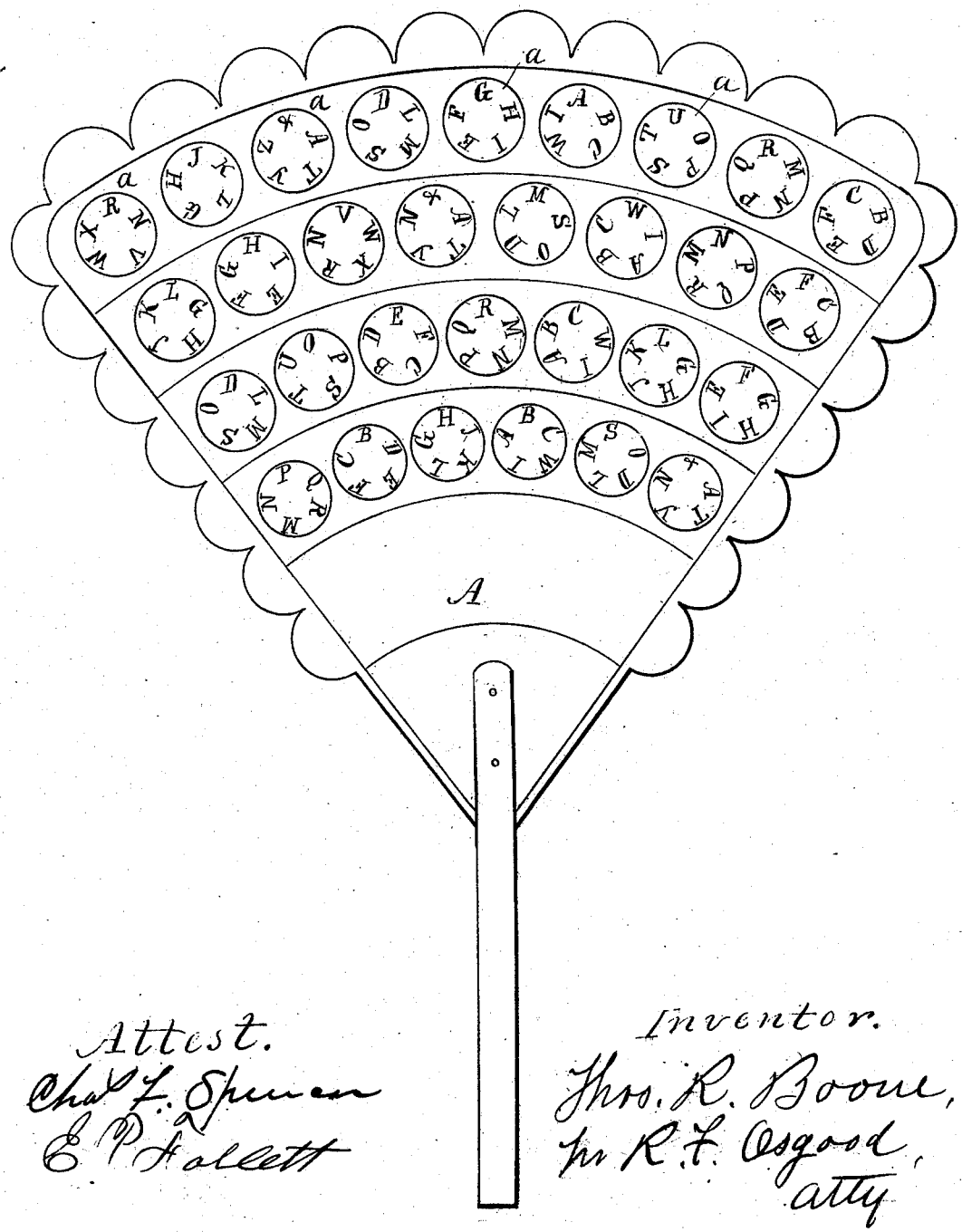
Figure 2:
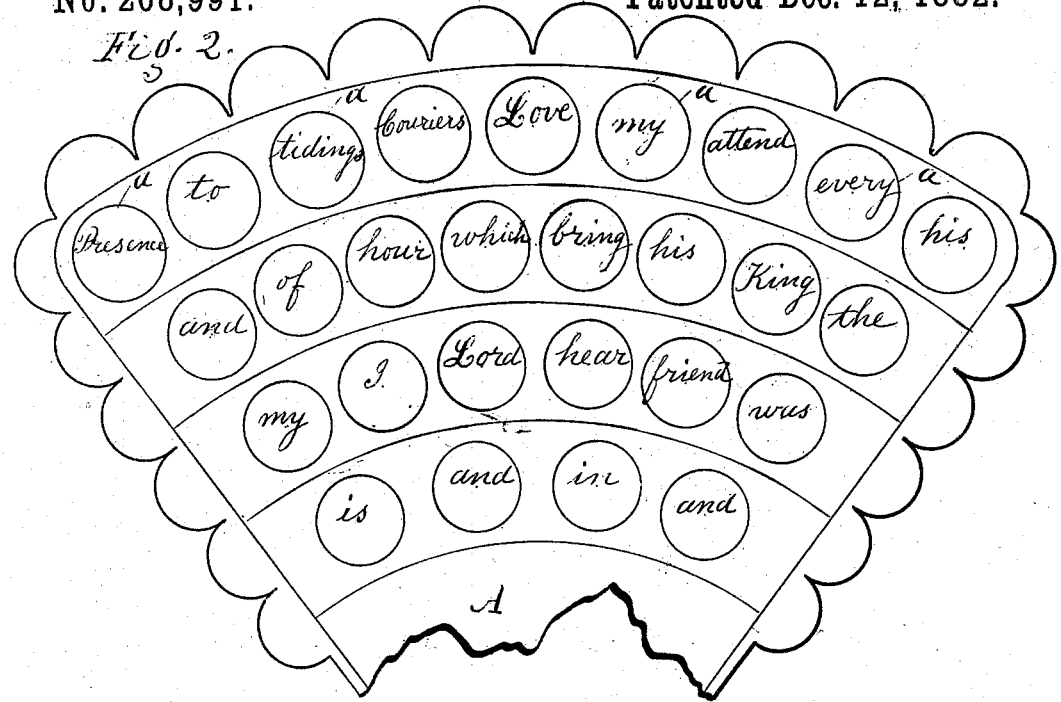
Figure 3:
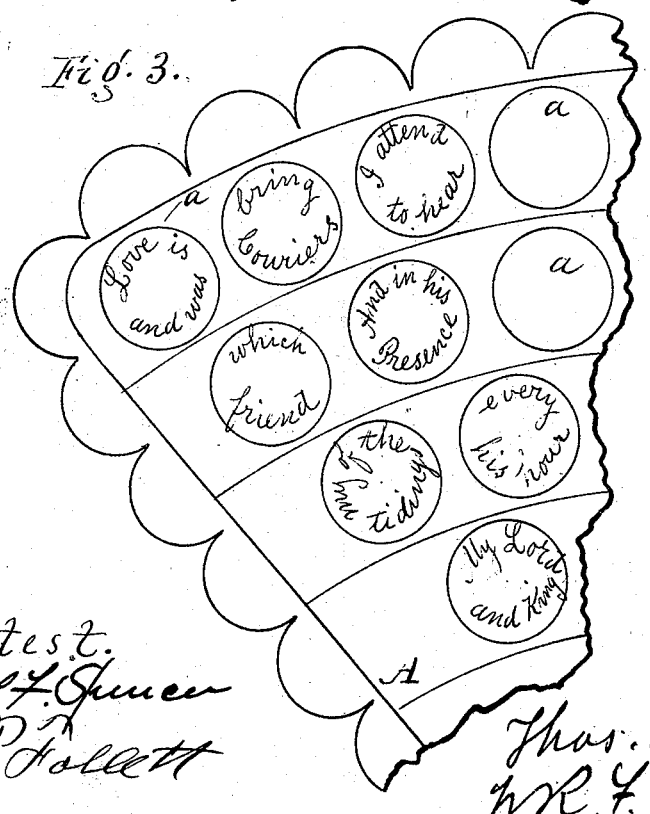

Figure 1 is a face view of a fan, showing my improvement. Figs. 2 and 3 are similar views, showing modifications.

My improvement relates to puzzles, in which a series of letters, words, parts of sentences, or sentences are transposed and arranged in sections promiscuously, the puzzle consisting in rearranging them in proper order to make sense.

The invention consists in the arrangement hereinafter more fully described and claimed.

In the drawings, A shows an ordinary fan, which has the puzzle printed upon one of its faces.

*a a* are a series of circles, in each of which are arranged a series of letters of the alphabet.

The puzzle consists in spelling a word by taking one letter from each of the circle composing one line or tier, four lines or tiers being shown in the drawings. In this case the first line or tier will produce a word of nine letters, the word being "Whalebone." The second line will produce a word of eight letters, being "Kirtland."

It is designed that but a single word can be spelled in each line, and owing to the very great number of combinations the puzzle is not easily solved.

The figures or diagrams inclosing the letters may be square, hexagonal, or of any other desired form instead of circular; and, if desired, they may be dispensed with entirely, and the letters only be used arranged in sections, as described; and, if desired also, the puzzle may be printed on cards, papers, or any other suitable articles instead of a fan. In Fig. 2 a similar arrangement is shown, in which words are used instead of letters, the puzzle consisting in rearranging the words to form a complete sentence, paragraph, or verse. In Fig. 3 the puzzle consists in arranging sentences or parts of sentences in a similar manner, which are to be rearranged to form a paragraph or verse to make complete sense. In the examples shown in Figs. 2 and 3 the key is as follows:

> Love is and was my lord and king,
> And in his presence I attend
> To hear the tidings of my friend,
> Which every hour his couriers bring.

Any desired subject-matter may be embodied in the puzzle, either of prose or poetry, and the puzzle may be sold simply as a subject of instruction or amusement, or in connection with advertisements, which may be printed on the back or on the edges of the fan or other article containing the puzzle. Instructions and directions for use may also be printed on the edges.

In this invention no key is used to aid in solving the puzzle; but it is left to the ingenuity of the person testing it.

I claim—

The puzzle herein described, consisting of a series of letters, words, sentences, or parts of sentences printed in separate sections upon a fan or other flat surface in transposed or irregular order and without a key, as herein shown and described.

In witness whereof I have hereunto signed my name in the presence of two subscribing witnesses.

T. R. BOONE.

Witnesses:
 R. S. OSGOOD,
 JACOB SPAHN.